(12) United States Patent
Giffin et al.

(10) Patent No.: US 10,142,410 B2
(45) Date of Patent: Nov. 27, 2018

(54) MULTI-MODE REMOTE COLLABORATION

(71) Applicant: Raytheon Company, Waltham, MA (US)

(72) Inventors: Monica L. Giffin, Hull, MA (US); Keith M. Janasak, McKinney, TX (US); Richard M. Pinti, Needham, MA (US); John A. Cogliandro, Dedham, MA (US)

(73) Assignee: Raytheon Company, Waltham, MA (US)

( * ) Notice: Subject to any disclaimer, the term of this patent is extended or adjusted under 35 U.S.C. 154(b) by 66 days.

(21) Appl. No.: 15/178,494

(22) Filed: Jun. 9, 2016

(65) Prior Publication Data

US 2017/0318084 A1 Nov. 2, 2017

Related U.S. Application Data

(60) Provisional application No. 62/329,545, filed on Apr. 29, 2016.

(51) Int. Cl.
*H04L 29/08* (2006.01)
*H04W 48/04* (2009.01)
(Continued)

(52) U.S. Cl.
CPC ............ *H04L 67/104* (2013.01); *H04L 47/76* (2013.01); *H04L 67/02* (2013.01); *H04L 67/025* (2013.01);
(Continued)

(58) Field of Classification Search
CPC ..... H04L 67/104; H04L 47/76; H04L 67/025; H04L 67/02; H04L 67/18; H04M 7/006;
(Continued)

(56) References Cited

U.S. PATENT DOCUMENTS 7,372,451 B2  5/2008  Dempski
8,234,095 B2  7/2012  Nagafuchi et al.
(Continued)

FOREIGN PATENT DOCUMENTS

EP  1227639 A2 *  7/2002  ............. H04L 29/06
EP  1227639 A2  7/2002
(Continued)

OTHER PUBLICATIONS

"International Application Serial No. PCT/US2017/029340, International Search Report dated Jul. 18, 2017", 7 pgs.
(Continued)

*Primary Examiner* — Uzma Alam
(74) *Attorney, Agent, or Firm* — Schwegman Lundberg & Woessner, P.A.

(57) ABSTRACT

Generally discussed herein are systems and apparatuses for multi-mode collaboration between entities in different jurisdictions. According to an example a technique can include determining a location of a remote communication device by at least one of a global positioning system (GPS), low frequency (LF) atomic time radio, earth magnetic signature, internet protocol (IP) address, and cell phone tower triangulation, determine regulations regarding communication from an internal network to the remote device based on the determined location, and configure the remote device to transmit and receive communications in a manner compliant with the determined regulations including one of voice over internet protocol (VOIP) communication, hypertext transfer protocol (HTTP) communication, text communication, voice communication, video communication, and augmented reality communication.

23 Claims, 7 Drawing Sheets

(51) Int. Cl.
*H04W 4/021* (2018.01)
*H04M 7/00* (2006.01)
*H04L 12/917* (2013.01)
*H04W 12/08* (2009.01)
*H04W 16/14* (2009.01)
*H04W 64/00* (2009.01)

(52) U.S. Cl.
CPC ............ *H04L 67/18* (2013.01); *H04M 7/006* (2013.01); *H04W 4/021* (2013.01); *H04W 48/04* (2013.01); *H04W 12/08* (2013.01); *H04W 16/14* (2013.01); *H04W 64/00* (2013.01)

(58) Field of Classification Search
CPC ..... H04W 4/021; H04W 48/04; H04W 16/14; H04W 12/08; H04W 64/00
See application file for complete search history.

(56) References Cited

U.S. PATENT DOCUMENTS

| | | | |
|---|---|---|---|
| 8,373,618 | B2 | 2/2013 | Friedrich et al. |
| 8,706,588 | B1 | 4/2014 | Zhu |
| 8,860,760 | B2 | 10/2014 | Chen et al. |
| 8,954,964 | B2 | 2/2015 | Weinstein et al. |
| 8,965,460 | B1 | 2/2015 | Rao et al. |
| 9,024,972 | B1 | 5/2015 | Bronder et al. |
| 2005/0154904 | A1* | 7/2005 | Perepa ............... G06F 21/10 713/193 |
| 2010/0197324 | A1* | 8/2010 | Bolin ............... H04M 3/38 455/456.3 |
| 2014/0197783 | A1* | 7/2014 | Kim ............... H02J 7/025 320/108 |
| 2014/0286178 | A1* | 9/2014 | Roy ............... H04W 24/08 370/252 |
| 2014/0313954 | A1* | 10/2014 | Choi ............... H04W 52/0258 370/311 |
| 2014/0342670 | A1* | 11/2014 | Kang ............... H04W 24/08 455/41.2 |
| 2015/0215844 | A1* | 7/2015 | Davis ............... H04W 8/12 455/432.1 |
| 2016/0241328 | A1* | 8/2016 | Kang ............... H04W 52/146 |

FOREIGN PATENT DOCUMENTS

| | | | | |
|---|---|---|---|---|
| EP | 1895750 | A1 | | 3/2008 |
| EP | 2017767 | A1 * | | 1/2009 ......... G06F 21/6245 |
| EP | 2017767 | A1 | | 1/2009 |
| EP | 2744251 | A1 * | | 6/2014 ............ H04W 48/04 |
| EP | 2744251 | A1 | | 6/2014 |
| TW | 201739232 | A | | 11/2017 |
| WO | WO-2008147258 | A1 | | 12/2008 |

OTHER PUBLICATIONS

"International Application U.S. Appl. No. PCTIUS2017/029340, Written Opinion dated Jul. 18, 2017", 11 pgs.

Bhatti, S N, et al., "Enabling QOS adaptation decisions for internet applications", Computer Networks and ISDN Systems, North Holland Publishing. Amsterdam, NL, vol. 31, No. 7, (Apr. 8, 1999), 669-692.

Henderson, Steve, et al., "Augmented Reality for Maintenance and Repair (ARMAR).", AFRL-RH-WP-TR-2007-0112, (Aug. 2007), 70 pgs.

Henderson, Steve, et al., "Evaluating the Benefits of Augmented Reality for Task Localization in Maintenance of an Armored Personnel Carrier Turret", IEEE International Symposium on Mixed and Augmented Reality, (2009), 135-144.

Hendryx, Archie, "The Sanman: Evolution & Emergence of the Hybrid Cloud", [Online]. Retrieved from the Internet: <URL: http://www.thesanman.org/>, (Jul. 2, 2014), 13 pgs.

Hendryx, Archie, "The Sanman: VDI—A Vulnerably Dangerous Investment or a Virtual Dream Inclusion?", [Online]. Retrieved from the Internet: <URL:, (Aug. 21, 2010), 7 pgs.

Jo, Geun-Sik, et al., "A Unified Framework for Augmented Reality and Knowledge-based Systems in Maintaining Aircraft", Association for the Advancement of Artificial Intelligence, (2014), 8 pgs.

Lamberti, Fabrizio, et al,, "Challenges, Opportunities and Future Trends of Emerging Techniques for Augmented Reality-Based Maintenance", EEE Transactions on Emerging Topics in Computing, vol. 2, No. 4, (Dec. 2014), 411-421.

Lipson, H, et al., "Online Product Maintenance by Web-Based Augmented Reality", (1999), 12 pgs.

Martinez, Hector, et al., "New Hybrid Approach for Augmented Reality Maintenance in Scientific Facilities", International Journal of Advanced Robotic Systems, vol. 10, 321, (2013), 10 pgs.

Sanna, A, et al., "Using Handheld Devices to Support Augmented Reality-based Maintenance and Assembly Tasks", IEEE International Conference on Consumer Electroncis (ICCE), (2015), 178-179.

Saske, Bernhard, et al., "Augmented Reality Based Maintenance Within Virtual Environments", Lehrstuhl KTC TU Dresden, [Online]. Retrieved from the Internet: <URL: https://www.youtube.com/watch?v=b0x0nZHGYc>, (Jul. 31, 2012), 2 pgs.

"Taiwanese Application Serial No. 106113121, Office Action dated Apr. 25, 2018", W/English Translation, 13 pgs.

"Taiwanese Application Serial No. 106113121, Response filed Jul. 4, 2018 to Office Action dated Apr. 25, 2018", W/ English Claims, 161 pgs.

\* cited by examiner

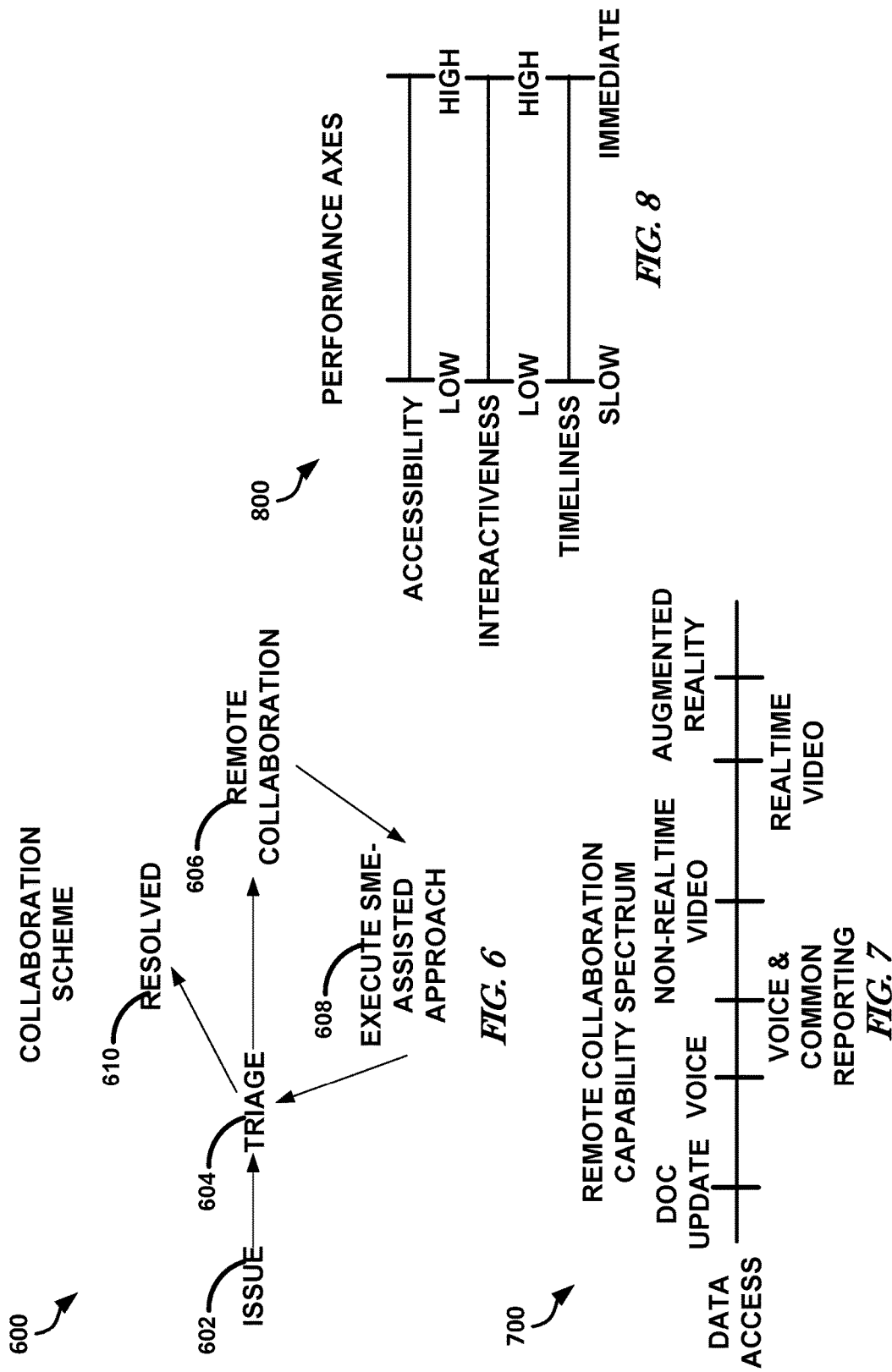

MULTI-MODE REMOTE COLLABORATION

CROSS-REFERENCE TO RELATED APPLICATION

This application claims the benefit of priority to U.S. Patent Application Ser. No. 62/329,545, filed on Apr. 29, 2016, which is hereby incorporated by reference herein in its entirety.

TECHNICAL FIELD

Examples generally relate to inter-country communication and/or collaboration. Some embodiments relate to secure communications across international boundaries, such as can be in accord with an international communication agreement, such as International Traffic in Arms Regulations (ITAR) and/or Export Administration Regulations (EAR).

TECHNICAL BACKGROUND

For practical purposes, ITAR regulations dictate that information and material pertaining to defense and military related technologies (items listed on the U.S. Munitions List) may only be shared with U.S. Persons unless authorization from the Department of State is received or a special exemption is used. U.S. Persons (including organizations) can face heavy fines if they have, without authorization or the use of an exemption, provided foreign persons with access to ITAR-protected defense articles, services, or technical data. Access, in terms of the ITAR and EAR regulations can include a transfer of a copy of a document or even a brief discussion about operation of the item.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates, by way of example, a flow chart of resolving an issue using one or more of the systems discussed herein.

FIG. 7 illustrates, by way of example, a line graph of a spectrum of capabilities, according to increasing bandwidth and resource usage that can be used in the collaboration.

FIG. 8 illustrates, by way of example, line graphs of accessibility, interactiveness, and timeliness.

DESCRIPTION OF EMBODIMENTS

Figure 1:
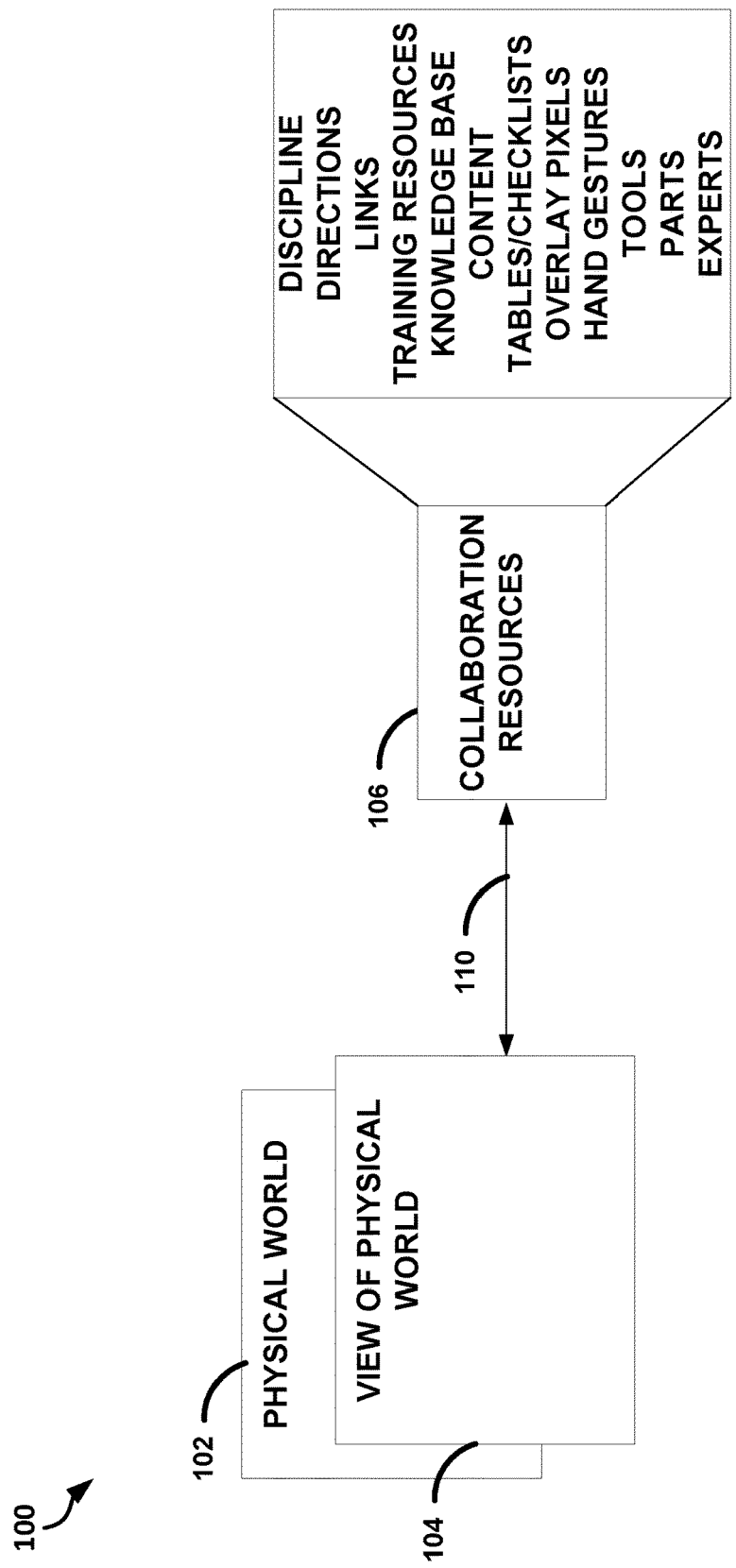
FIG. 1 illustrates, by way of example, a system for providing collaboration data between entities.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Whether internally within a company or externally between, for example, a company and its customers, an entity can spend millions of dollars annually to provide "just in time" technical support for their customer or employee base. Technical support can include troubleshooting, maintenance, repair, training, inspection, or the like. Embodiments discussed herein can help provide remote guidance and collaboration between geographically dispersed locations for engineering project management office (PMO), production/test facility, repair, refurbishment, troubleshooting, and/or training. Embodiments discussed herein can help provide remote guidance and/or collaboration between maintenance personnel, such as for support of systems deployed in a different country or requiring "eyes on system". Embodiments discussed herein can help in complying with ITAR and/or EAR mandates, such as by providing a secure, compliant infrastructure through which to share information. Embodiments discussed herein can provide a secure remote collaboration solution that can provide an information mixing and presentation that can be optimized in consideration of the tools available and/or goal(s) at the time of collaboration.

Embodiments can include a solution that provides (e.g., automatically (without human interference after deployment)) an appropriate collaboration approach by choosing appropriate functionality for collaboration that meets the demands of the reason for the collaboration, given the location, regulations, and available resources. Embodiments can address user resource constraints. For example, the systems can consider user needs, capability of system, capacity of system, and tools. For example, if a user only has a cellphone with low/no bandwidth, the system can provide audio only access (e.g., without video) because of the user's system's capacity constraint. In another example, a user only has a cellphone and the system can turn off a preferred embodiment of augmented reality due to a hardware capability restraint.

Consider a scenario in which there is a machine in a remote location. Access to the machine includes travelling unimproved roads. Consider further that the machine is a helicopter with a mechanical problem. The helicopter was sent to the remote location to save people trapped from a volcano, flood, or earthquake. There is a need to fix the helicopter to save lives, but the helicopter cannot just fly back to the factory where the expert to fix the helicopter resides because of the mechanical problem. National laws prevent the "transfer of knowledge" to that country to fix the helicopter, even if it was in a hanger with a professional mechanic. If the personnel have a cell phone or other communication device, they could have the device "transmit" or "receive" data in an ITAR safe manner to "teach" or "help" the personnel in the remote location of the broken machine to fix it, without actually transmitting data, and without the mechanic on either end needing to understand ITAR, laws, information technology, bandwidth, and/or bits and bytes.

Also consider the difficulty of transporting the helicopter to a repair facility from the remote facility. The ability to repair the helicopter in the field would provide a much more resource and cost effective solution to repairing the helicopter. Also, repairing the helicopter in the field would save time, such as can be important in many military and other operations. All that may be required to repair the helicopter is information, tools, and/or a mechanic.

Remote can mean any distance removed from the information source and out of the internal network. Communications can be machine to machine, peer to machine, or peer to peer. Note that some communication cases may not be ITAR compliant. Whether across the parking lot, or across the globe, personnel (e.g., a subject-matter expert (SME)) is generally communicating with another person of equivalent or lesser understanding of the subject matter of the collaboration. The collaboration can be to "help" them diagnose and fix a problem, such as a mechanical, medical, personal, financial, economic, or business problem, among others.

FIG. 1 illustrates, by way of example, a system 100 for providing collaboration data between entities. The system 100 as illustrated includes a physical world 102, a view of the physical world 104, and collaboration resources 106. The physical world 102 can include internal personnel (e.g., one or more experts) to provide collaborative support to remote personnel (e.g., a remote mechanic). The physical world 102 is the environment around the internal personnel and the remote personnel. The view of the physical world 104 can include a display of the respective physical worlds of the remote personnel, the collaboration resources 106, and the internal personnel. The view can be provided over a linkage 110.

A view of one or more of the collaboration resources 106 can be provided to the remote personnel, such as to assist them in fixing a remote problem. The collaboration resources 106 can include directions, discipline information, system function and/or sensor data, links, training resources, knowledge base content, tables and/or checklists, overlay pixels, hand gestures, tools, and/or parts.

The linkage 110 can provide the view of the physical world to the respective personnel in a variety of formats (e.g., video, real-time video, augmented reality video, text, voice, or other format).

Figure 2:
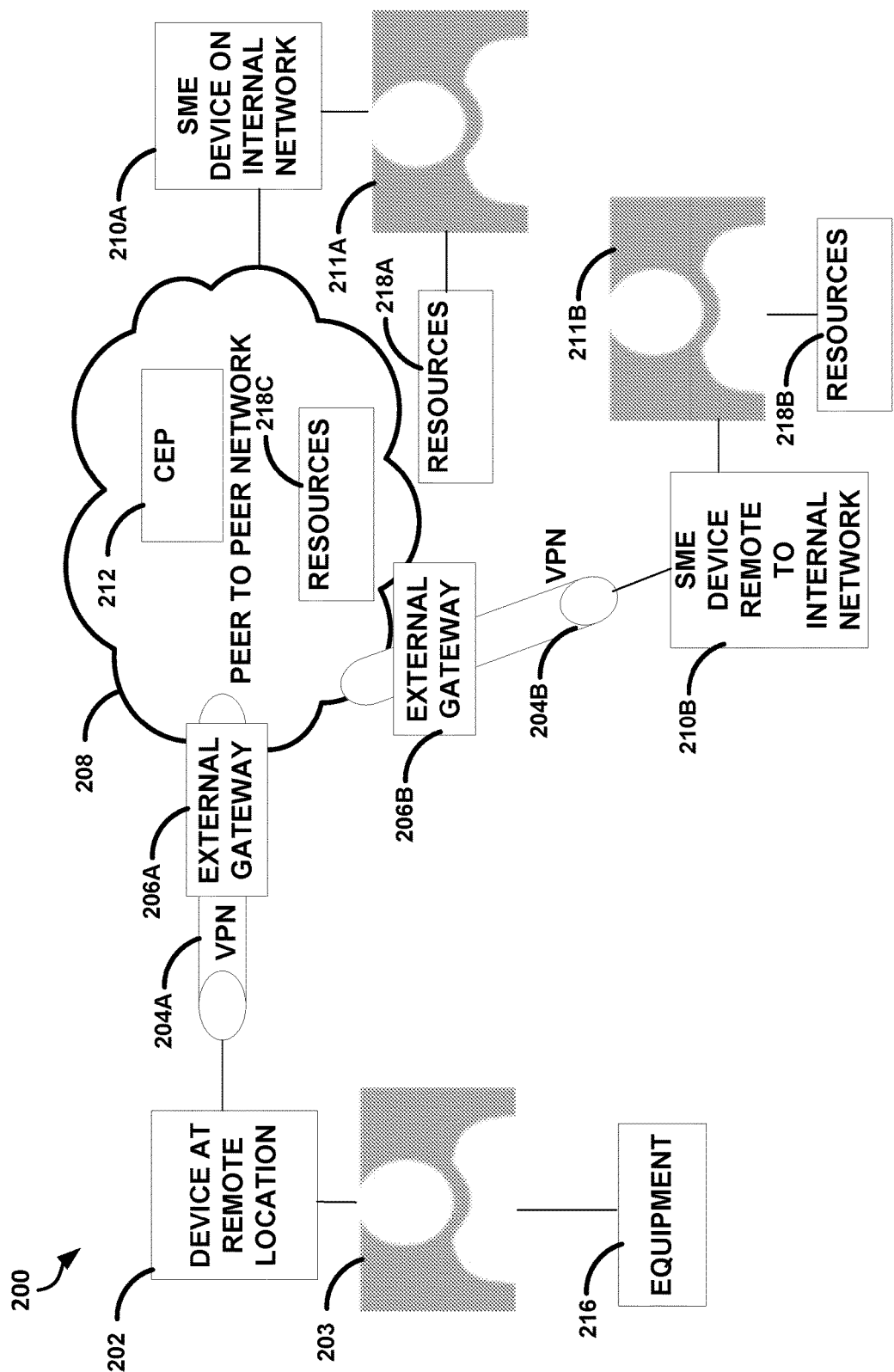
FIG. 2 illustrates, by way of example, a logical block diagram of a system for providing multi-mode collaboration between entities (e.g., clients, such as internal and remote clients).

FIG. 2 illustrates, by way of example, a logical block diagram of a system 200 for providing multi-mode collaboration between entities (e.g., clients, such as internal and remote clients). The system 200 generally includes more implementation details than the system 100. The system 200 as illustrated includes a device at a remote location 202 (e.g., a phone, radio, such as a smart phone, a tablet, computer, or other communication device), a remote user 203, a virtual private network (VPN) 204A, an external gateway 206A, a peer to peer network 208, an SME device on the internal network 210A, an SME device remote to the internal network 210B, a collaboration environment processor (CEP) 212, equipment 216 (e.g., an object that is the reason for the collaboration, such as a machine, system, person, circuit, system of systems, or the like), one or more SMEs 211A and/or 211B, and resources 218A, 218B, and/or 218C. The resources 218A-C can include an equipment user manual, training bulletin, field bulletin, part number, manufacturer information, technical specification, video advice, audio advice, textual advice, or the like.

The device at the remote location 202 has communication capabilities and communication limitations. The capabilities and/or limitations of the device 202 can be stored in a database of the network 208 (see FIG. 3). The device 202 can access the network 208 through the VPN 204A and/or the external gateway 206A.

The VPN 204A extends the network 208 across a public network, such as the Internet, a cellular network, a local area network (e.g., a Wi-Fi network), or other network. The VPN 204A allows users (e.g., remote and local users) to send and receive data across the network 208 as if the devices 202/210A-B were directly connected to the network 208. The VPN 204A, such as through the CEP 212, provides the functionality, security, and management policies of the network 208 to the device 202. The VPN 204A can be created by creating a virtual point-to-point connection using virtual tunneling protocols and/or traffic encryption.

The external gateway 206A provides access control to data on the network 208. A user of the device 202 can have an identification that can be used to access resources of the network 208. The identification can be associated with one or more privilege levels, such as in a database of the network 208 (see FIG. 3).

The network 208 is a private, secure network that provides collaboration resources and data to the remote device 202 and/or the device 210 A-B. More details regarding an embodiment of the network 208 is provided in FIG. 3.

The device 210A on the internal network 208 can include a communication device, such as a phone, tablet, computer, scanner, radio, augmented reality video processor (e.g., a 3D augmented reality video processor) or other communication device. The device 210A can be used to provide collaboration data to the device 202, such as can be in a manner as determined by the CEP 212. The device 210A-B has communication capabilities and communication limitations. The capabilities and/or limitations of the device 210A-B can be stored in a database of the network 208 (see FIG. 3). The device 210A has direct access to the network, while the device 210B accesses the network 208 through the VPN 204B and/or the gateway 206B. The device 202 can include communication capabilities and limitations that are apparent to the CEP 212.

The CEP 212 determines or identifies resources requested at the device 202, such as by the remote user 203 or equipment 216, resources 218A-C available for the SME 211A-B, the remote user 203, or the equipment 216 to reference, capabilities of the device 202, capabilities of the remote network to which the device 202 is connected, location of the device 210A-B, location of the SME 211A-B, location of the device(s) 202 and/or 210A-B, regulations or rules governing communication between the locations of the devices 202, 210A-B, and/or SME 211A-B, a cost of the collaboration, an urgency (e.g., concept of operations (CONOPS)) of the collaboration that are determined automatically or provided by the remote user 203, bandwidth available (current and/or predicted) at the network to which the device 202 is connected, bandwidth available (current and/or predicted) at the device 202, bandwidth available (current and/or predicted) at the device 210A-B, bandwidth available (current and/or predicted) over the network 208, and/or power requirements or power available at the device 202 and/or 210A-B or the equipment 216. The CEP 212 can consider one or more of limitations and/or capabilities and the determined/identified data in providing collaboration data (e.g., optimal collaboration data) to the device 202.

Note that while the CEP 212 is illustrated as being a part of the network 208, the CEP 212 can alternatively be implemented as a dangle, client, or other tool that can be on, communicatively coupled, or connected to the device 202.

The power requirements and/or power available can include an amount of battery life available at the device 202 and/or 210A-B and/or the equipment 216, among others (if applicable). In one or more embodiments, an estimated amount of time for multiple collaboration scenarios can be determined based on the amount of battery life. If the determined amount of time (e.g., as determined by the CEP 212) is determined to be insufficient to solve the problem, a less power consuming collaboration technique may be chosen, such as to help extend an amount of time to provide collaboration data to the remote location. In one or more embodiments, the CEP 212 may determine that there is a low power condition during a collaboration, alert the remote user 203 and/or SME 211A-B, and provide signals that cause the object with the low power situation and other affected devices to alter the collaboration methodology (e.g., switching from video and voice communication to just voice communication, switching from voice communication to text communication, or the like).

If the internal device 210A, SME 211A, and/or resources 218A are not within the internal network 208 for a given collaboration, a second VPN 204B and/or gateway 206B can be used to help securely facilitate the collaboration. The VPN 204B and gateway 206B are optional and can be used in embodiments in which an SME is provided remote access to the network 208, such as to help secure collaboration between two remote users (e.g., the SME 211A and the remote user 203). The VPN 204B can be the same as or similar to the VPN 204A. The VPN 204B can provide the device 210B with access to the network 208. The gateway 206B provides access control to the content of then network 208, similar to the gateway 206A. The device 210B is the device or application through which internal collaboration personnel (e.g., an SME) receives data regarding the collaboration from the network 208 and the device 202. The device 210A-B can provide collaboration data back to the device 202, such as through the VPN 204B, gateway 206B, and the network 208. The collaboration data from the device 210B can include an indication of one or more resources, resources themselves, answers, or other information to provide to the device 202. The indication and/or use of one or more resources 218A-C can include a pointer to information on the network 208 which can be retrieved and provided to the device 202.

The equipment 216 is the object which is the subject of the collaboration, such as a machine, system, person, circuit, system of systems, other entity, such as a government, corporation, organization, educational or other institution, or other entity, or the like.

The network 208 can receive a query or a request from the device 202 for collaboration information, such as through the VPN 204A and/or the gateway 206A. The network 208 can provide the request or query to the device 210A-B, such as through the VPN 204B and/or the gateway 206B. The device 210A-B can provide a request for more information to the device 202, such as through the network 208.

The resources 218A-C can be in one or more locations, such as remote to the internal network (i.e. resources 218B, local to the SME 211A on the network (i.e. 218A), or accessible through the network 208 (i.e. resources 218C). Different resources 218A-C may be available in different locations.

In one or more embodiments, the resources 2181-C represent detailed component information, such as a 3D computer aided design (CAD) model of the component. In such examples, substantially all of the system may be used to provide a physical component (e.g., a bushing or lever) or system upgrade (e.g., a firmware upgrade to a field programmable gate array (FPGA)) to the equipment 216 with or without providing information to the remote field device 202 and/or with or without also providing SME advice to a remote user. In example embodiments the information is used to provide actual just-in-time physical components which are manufactured on-site at or near the equipment 216 location with instructions that are transmitted from resources, such as the resources 218A-C to the device 202 (a 3D printer or lathe) and subsequently installed at the equipment 216 in the remote location. In one or more embodiments the information is used to provide a firmware upgrade directly to equipment 216 without reliance on the SME 210 A-B, a mechanic (e.g., the remote user 203), or a device, such as the device 202.

Figure 3:
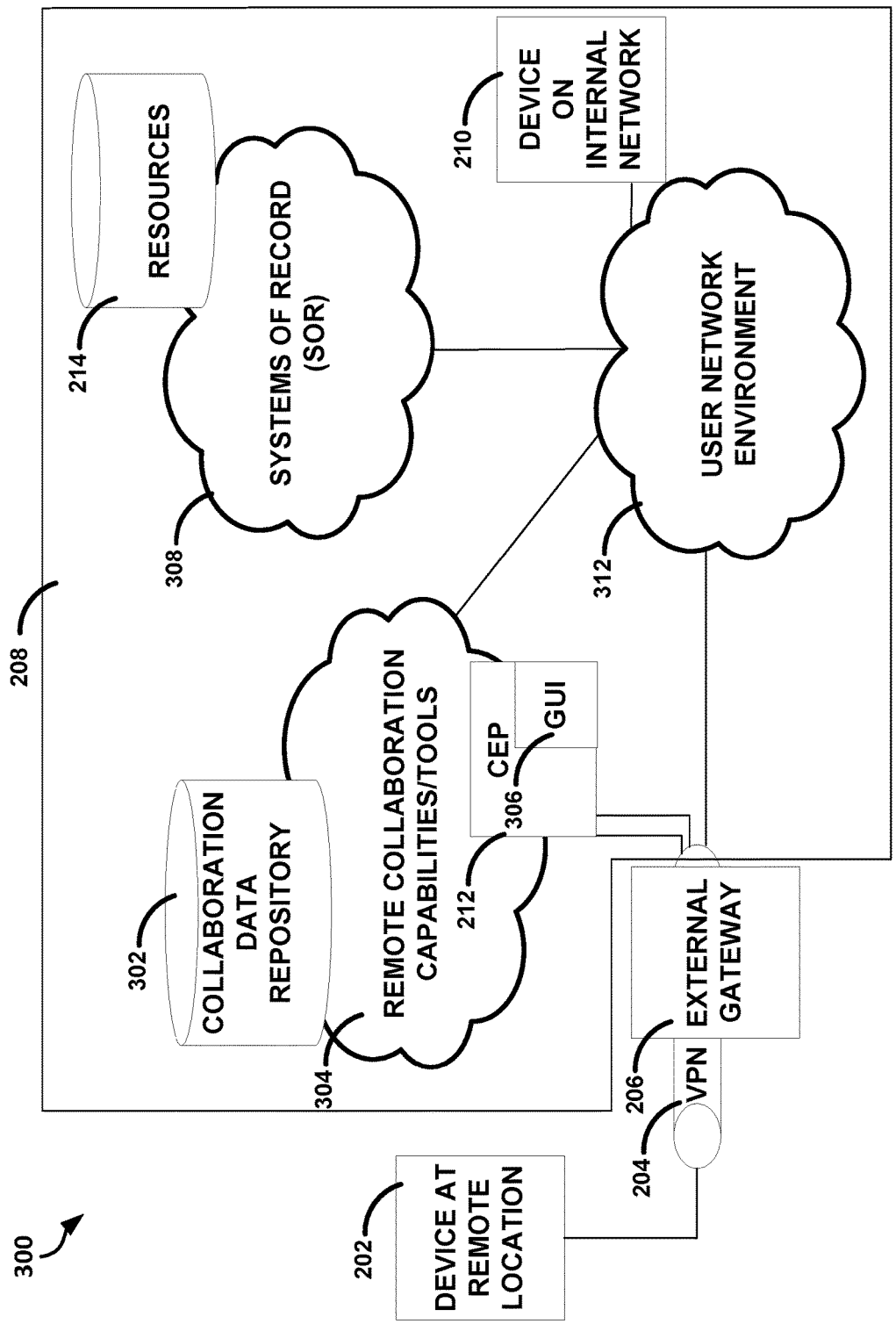
FIG. 3 illustrates, by way of example, a logical block diagram of an embodiment of a system that includes a more detailed view of an embodiment of the network of FIG. 2.

FIG. 3 illustrates, by way of example, a logical block diagram of an embodiment of a system 300 that includes a more detailed view of an embodiment of the network 208. The network 208 as illustrated includes a collaboration data repository 302, a remote collaboration capabilities/tools network 304, a systems of record network 308, a resources repository 310 (e.g., a repository for file resources, such as can be specific instances of the resources 218A-C), and a user network environment 312.

The collaboration data repository 302 can store information about the capabilities and limitations of the device(s) 202 and/or 210A-B, SME 210A-B, and/or the remote user 203. The information can include country specific ITAR laws, network or modem connection preferences, cell phone limitations, cell phone carrier limitations, equipment limitations and/or capabilities, or the like. The remote collaboration capabilities/tools network 304 provides access to devices to be used during the collaboration. The tools from the network 304 can be used to present the information from the resource repository 310 to the device 202, such as can include a view of the resources 218A-C and/or advice from the SME 210A-B. The tools can include a video player, an augmented reality device, a voice over internet protocol (VOIP) device, a text rendering device, among others. The device 202 can include capabilities that can interact with one or more tools available from the network 208.

The CEP 212 as illustrated includes a graphical user interface (GUI) 306. The GUI 306 can provide a user with a view of collaboration access information. The GUI 306 can allow a user, such as a user of the remote device 202 or the internal device 210, to alter one or more variables governing the collaboration. Adjusting one or more variables of the collaboration can alter the form in which the information is presented to the device 202, such as by selecting a different tool from the network 304 to provide the information. Adjusting one or more variables of the collaboration can alter a timeframe in which the information is provided to the device 202.

The systems of record network 308 provides access to details regarding resources available at remote locations, such as by users of the device 202, and/or rules or regulations governing communications between locations of the device 202 and the network 208. The collaboration data repository 302 includes the actual details regarding resources available at the remote devices and/or the rules or regulations governing communications between locations of the device 202 and the network 208. The details regard resources available at the remote locations can include device capabilities (voice, text, AR, or the like), tools available to help fix the equipment 216, expertise, licenses, or training certificates of personnel at the remote and internal locations, or the like. The rules and/or regulations can include a table or file indicating what types of communications are allowed between locations, such as by the ITAR/EAR.

The user network environment 312 includes resources through which the device 210 communicates, such as virtual and/or physical computers (e.g., a virtual desktop environment connected to a physical computer environment).

Figure 4:
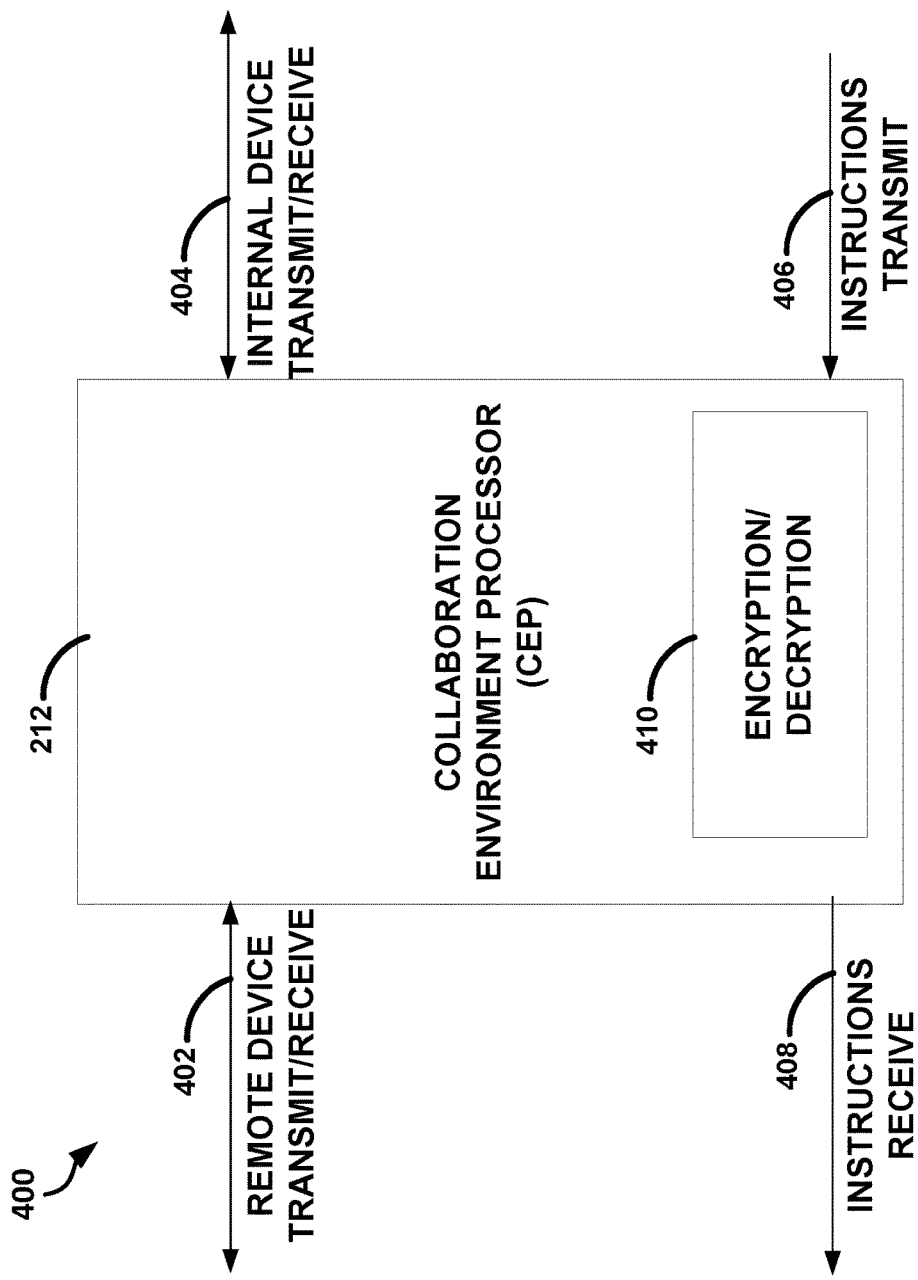
FIG. 4 illustrates, by way of example, a logical block diagram of a system that includes a collaboration environment processor (CEP) and communications to/from the CEP.

FIG. 4 illustrates, by way of example, a logical block diagram of a system 400 that includes the CEP 212 and communications to/from the CEP 212. The communications as illustrated include a remote device transmit/receive 402 communication. The remote device transmit/receive 402 can include a request or query for information. In one or more embodiments, the request or query can indicate one or more input variables to govern the collaboration. The remote device transmit/receive 402 communication can be encrypted and decrypted by the CEP 212. The one or more input variables can include an urgency, resources available remotely, capabilities of devices available remotely, bandwidth available remotely, cost, or other variables. In one or more embodiments, the CEP 212 can determine the one or more variables, such as by issuing a query or request to the system of record (SOR) data repository. The request or query can include data indicating the make and/or model of the device 202, such as to determine the capabilities of the device 202.

The communications as illustrated include an internal device receive/transmit 404 communication. The internal device receive/transmit 404 can include some indication of the variables and/or the data being requested by the remote device, such as is indicated by the remote device transmit 402 communication. The internal device receive/transmit 404 can be provided to the device 210A-B.

The communications as illustrated include instructions transmit 406. The instructions transmit 406 include information to help answer the query, a request for more information, or other information.

The communications as illustrated include an instructions receive 408 communication. The instructions receive 408 can be provided in the form of pixels, such as can provide a view of a screen of a virtual computer or a physical computer. The instructions receive 408 can be encrypted. The instructions receive 408 can be deleted after viewing or after a predetermined amount of time has elapsed.

Figure 5:
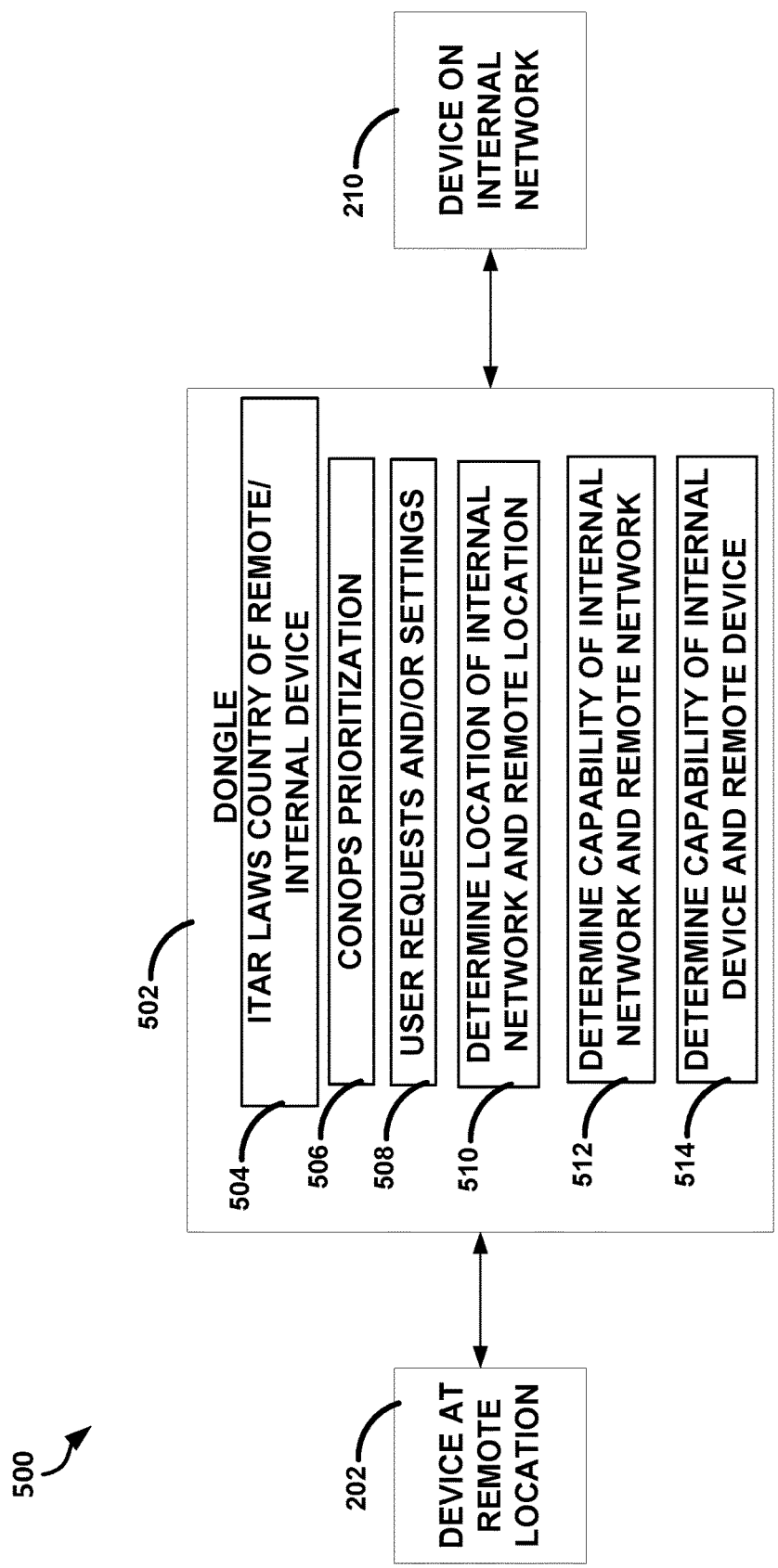
FIG. 5 illustrates, by way of example, a logical block diagram of an embodiment of a system for communicating collaboration data between two devices.

FIG. 5 illustrates, by way of example, a logical block diagram of an embodiment of a system 500 for communicating collaboration data between two devices. The system 500 as illustrated includes a dongle 502 (i.e. a specific embodiment of the CEP 212) connected between the device 202 and the device 210. The dongle 502 (FPGA, power, memory, read-write, and associated communication sensing hardware) is a switch capable of robustly evaluating first-order logic (such as which combination of linkages to provide the user pair) in a number of ways by switching between pairs to select a communication protocol to meet security, bandwidth, user needs, data on hand, power on hand, and/or communication protocol issues.

The dongle 502 can retrieve, such as from the network 208, ITAR laws 504 of the country in which the remote device 202 resides and/or ITAR laws of the country in which the internal network 208 resides. The ITAR laws 504 can indicate which communication protocols are allowed or prohibited between the respective countries of the device 202 and the device 210A-B. The dongle 502 can retrieve or otherwise determine a priority 506 of the request from the device 202 based on an urgency (e.g., CONOPS) indicated in the request. The dongle 502 can receive and/or determine user requests and/or settings 508. The dongle 502 can determine a location 510 of the internal network and a location of the device 202. These determined locations can be used to determine which LIAR laws 504 to retrieve and/or process. The location can be determined by issuing a request to the device 202 or the device 210. The location can be determined using a GPS, satellite triangulation, low frequency FM triangulation, internet protocol (IP) address, or other location determination process of the dongle 502.

The dongle 502 can determine capabilities of the internal and remote networks 512. The capabilities can include whether the network allows VOIP data, video, text, AR data, bandwidth, security available, or other capabilities. The dangle 502 can determine capabilities of the internal and external devices 514. The capabilities of the internal and external devices can include whether the device can handle VOIP data, video, text, audio, AR data, bandwidth, security available, or other capabilities FIG. 6 illustrates, by way of example, a flow chart 600 of resolving an issue using one or more of the systems discussed herein. An issue is presented at operation 602. The issue generally regards a problem faced at the remote location. The issue can be presented to the device 210, such as by issuing a query or request to the network 208. Triage is performed at operation 604. Triage includes determining a priority for the issue and/or resources that can be used to help solve the issue. Remote collaboration occurs at operation 606. The remote collaboration includes issuing instructions or requests for more information to the device 202 and receiving responses thereto. Executing an SME-assisted approach can be performed at operation 608. In one or more embodiments, operation 608 can include manufacturing a component at or near the remote location. The SME-assisted approach can include the remote personnel fixing the issue to which they received instructions or direction. After that issue is fixed operations 604, 606, and/or 608 can be performed until the issue is fully resolved at operation 610. The issue can be fully resolved after the personnel associated with the device 210 and the device 202 agree that the issue is resolved.

FIG. 7 illustrates, by way of example, a line graph 700 of a spectrum of capabilities, according to increasing bandwidth and resource usage that can be used in the collaboration. AR as illustrated generally takes up the most resources and/or bandwidth. Real time video generally takes up less resources and/or bandwidth than the AR, but more than non-real time video. Non-real time video generally consumes fewer resources and/or bandwidth than real time video, but more resources than voice and common reporting. Data access takes up the fewest resources and bandwidth, a document update generally consumes more resources and/or bandwidth than the data access, and voice generally consumes more resources and/or bandwidth than the doc update and fewer resources and/or bandwidth than the voice and common reporting.

FIG. 8 illustrates, by way of example, line graphs of accessibility, interactiveness, and timeliness. The CEP 212 considers these three factors in determining a triage and communication protocol to be used in helping to fix an issue. Accessibility can include factors like bandwidth, resources available, and the like. Interactiveness can include the nature of the issue (e.g., how much interaction is required or desired by the SME or the network 208 to help fix the issue), the resources and/or bandwidth available, or the like. The timeliness can include an urgency of the issue to be resolved.

The CEP 212 (whether in a dongle coupled or connected to the device 202, or available in the network 208) has, uses, or otherwise can communicate using a modem or similar device on a remote device network and an internal network (the network over which the SME personnel communicate). The modem can support several international standards, such as International Telecommunication Union ITU V.21, V.23, R.35, R.37, R.38A, R.38B, V.29, Bell 103, Bell 202, and/or proprietary communications standards as needed. The modem can be a programmable modem for a Supervisory Control and Data Acquisition (SCADA) or power utility communication network that can be switched according to the needs commanded by the CEP 212. The modem can operate in half or full-duplex, point-to-point, or point-to-multipoint modes. The CEP 212 can interface with the modem and command changes to a Digital Signal Processor (DSP) (e.g., a field programmable gate array (FPGA)), providing flexibility through programmable features. Software configuration can be performed via a command set, such as a Hayes AT command set or equivalent depending on the brand and manufacturer of the DSP. Commands can be initiated from within the network, such as by using an RS-232 or similar communication interface. In one or more embodiments, transmission rates can be around 300 to 9600 baud, such as with a 2400 Hz deviation and 420 to 3480 Hz channel mean frequency.

One or more embodiments of the system allow for if user mobility at the remote and/or internal networks. Usually the mobility is primarily at the remote sick but can also be at the primary (internal) side. Such a configuration can help avoid the need to bring a large, heavy, and/or complex system into a secure location. For example, consider dismantling a special weapon system. The system may be transported to a secure location for diagnosis and repair that may be minor and may otherwise have been able to be repaired in the field, such that transport to the secure facility may be unnecessarily costly. Using one or more systems discussed herein, internal personnel could make a diagnosis and instruct the remote personnel on how to repair the system without needing to transport to the secure location. This could potentially save months of down time and the costs of disassembly, transport, diagnosis, and repair. This is, because the secure internal location knowledge is brought to the system in need of repair instead of bringing the system in need of repair to the secure location.

Each mission scenario (e.g., CONOP) can include a combination of communication parameters (e.g., a different combination of communication parameters), such as in a memory in the CEP 212 or otherwise accessible by the CEP 212. For example, different location and CONOP pairs can include a different CEP solution. The number of combinations and permutations can get large quickly with just a few communication parameters (e.g., variables), such as security level, CONOPS (e.g., urgency/speed/time constraint), cost, bandwidth available (e.g., at the remote device, internal device, remote network, and/or internal network), bandwidth requested, data type, equipment type, or other. The CEP 212 helps facilitate the decision and/or connection process and provide a linkage/solution that matches the CONOPs for the end user pair.

Many communication systems use enabling technology including an in-country network. One or more embodiments can incorporate that technology into the solution. Each country generally has a different network and each network (Verizon, AT&T, Vodafone, Deutsche Telecom, etc.) has different technology (land lines, fiber, satellites, etc.), capability, and rule sets for usage. Some in-country networks are govt. controlled and some are private. Some in-country networks have no emitters, no connections, some have hot spots, and some have no hot spots. The in-country networks vary in throughput, cost per bit, reliability, speed, corporate and in-country policies, and so on. In one or more embodiments, the CEP 212 can help the user navigate and choose between combinations and permutations of the equipment, the needs, and the rule sets and/or choose between efficient or desirable providers when multiple bandwidth choices may be available.

In one or more embodiments, the CEP 212 can identify an available network, understand the protocols and policies associated with that network, and communicate using the network as needed. The CEP 212 can get a read on what is available through the network in terms of signal strength, range, location, traffic control, users, devices, overrides, etc. and select (e.g., automatically) settings operable to communicate over the network, such as to help avoid user error and frustration in selecting operable settings.

The CEP 212 can balance resiliency, security, and functionality to provide a collaboration between an internal device and an external device. In the age of Cyber Security/Cyber Resiliency, it is difficult to provide resiliency, security, functionality, and ease of user interface and still provide utility. If everything is locked down to provide maximum security, then no work gets done and there is no utility. If everything is unlocked and there is no security, the data exchange rate may increase, but the data may be vulnerable and utility can be affected. The CEP can help balance the supply of data and demand of data with security and legality and equipment capability to provide a solution with utility.

Along with remote collaboration capability and ITAR security of covered defense information are information security and information assurance, both of which can be handled by one or more systems or devices discussed herein. ITAR de facto imposes a subset of cyber security requirements and provides an additional layer of requirements beyond the general base cyber security requirements of an entity. Embodiments discussed herein, while not limited to such, are focused on ITAR compliance/requirements.

In some embodiments, information is provided to a remote device 202 and to an SME device 201A-B, such as without storing data on one or more of the devices 202 and/or 210A-B. Information transferred to the remote device can be streamed without being stored, temporarily stored, monitored, and then deleted, such as after a user of the remote device disconnects from the internal network. Since ITAR often does not allow transfer of certain data types (e.g., pictures, files, executables, or the like) across certain geographical boundaries, care can be taken to make sure that information is provided without transferring the certain data types. This may be done by removing data after rendering.

Information provided from the internal network cannot be stored or recorded at the remote device. The data may never be "transferred" from the core environment to the remote user's (e.g., the remote user 203) environment, but still may be viewed by the remote user 203 who is able to digest the information and act on it the information is removed after the session is ended, and in some embodiments, even before a next screen is presented.

Such a presentation can be ITAR compliant, such as if both receive and transmit information are encrypted. The encryption can include an augmented reality collaboration solution operating through a virtual desktop infrastructure (VDI) environment. A combination of a secure virtual private network (VPN) pipe and VDI that hosts data behind a firewall with physical and electronic access control can provide increased information security. Further security can be gained by requiring both parties to meet authentication standards.

In one or more embodiments, only pixels can be transmitted, instead of moving data files. The pixel transmissions can be encrypted on both send and receive ends, so that if anything intercepts in between or interrupts at the ends, there may be no actual data stolen since the pixels will be random, indiscernible, and/or meaningless. Such a system becomes a virtual disappearing network that provides display data, but does not send other to the peripheral locations. In one or more embodiments, the transmitted data can be a floating and/or encrypted VIM packet, and can be self-regulating. In such an environment, there is no "data at rest" (i.e. stored on a memory) beyond the core environment or a cache memory that will be overwritten on the external device. In the context of ITAR relevance, residence of data within the internal network does not constitute an export. Taken as a whole, the data provided to the device 202 can remain internal to the network 208. Some examples of data that can be rendered on the remote device through the VPN/VDI as pixels can include: line drawings; text of manuals (e.g., machine settings, instructions, etc.); field bulletins; maintenance data; two-dimensional (2D) video; three-dimensional (3D) video; 3D virtual/augmented reality (e.g., with goggles, etc.); and computer-aided design (CAD) models, among others. In one or more embodiments, the data can be voice data that is provided through a speaker and not stored on the external device such as in voicemail (VM).

In one or more embodiments, the system can include a VDI/VPN and AR, non-AR video, and/or audio based collaboration equipment. One or more embodiments include about 8 or more technologies integrated to each other to provide security, network management, bandwidth monitoring, VPN, VDI, and the like. There are currently no known systems that provide ITAR secure transfers of collaboration content as one or more embodiments discussed herein. Embodiments discussed herein can provide capability of hosting the data, systems of record (manuals, technical data package, reliability info, vendor info, part info, maintenance info, field bulletins, etc.) behind the firewall, and a VPN/VDI pipe.

In one or more embodiments, the CEP 212 can include code running on hardware which can remotely sense or otherwise gather knowledge of what resources a remote user has available in the field (the remote location) (e.g., by the 'user sign in' CEP 212 can detect the users personal info (e.g., system administration (s/a) training certs, welding certs, etc.) through a link to the organizational human resources (FIR) system (e.g., data stored on the internal network). In one or more embodiments, the CEP 212 can detect and determine the user's communications equipment capability (cell phone (basic or smart), tablet, full PC, radio, or the like), such as by detecting a type of equipment to which the CEP 212 is connected or otherwise communicatively coupled to or prompting the remote user to provide such information.

In one or more embodiments, the CEP 212 can detect the internal device and remote device location(s) for both primary (home base, SME) and remote (mechanic in the field) using global positioning system (GPS), low frequency (LF) Radio, Internet protocol (IP) address, or the like). In one or more embodiments, the CEP can receive user specific commands (requests) for data type (photo, text, video, full 3D VR, voice, etc.), speed, cost, transmission urgency (e.g., CONOPS), and/or a request to override rules/regulations, such as in case of emergency.

In one or more embodiments, the CEP 212 can look up, such as in a database, local and national governmental laws and regulations related to inter-country data transfer (known as EXIM in USA). In one or more embodiments, the CEP 212 can look up, such as from the database, specific organizational data transmission regulations (company specific) and CEP 212 can sense or receive CONOPS (concept of operations) priorities, such as "fix as quickly as possible for emergency situation regardless of reliability", "fix in most reliable method regardless of cost or time required", or "reset to operate in degraded mode regardless of pending damage to machinery", or the like. The CEP 212 may choose or suggest, based on the CONOPS or other parameter(s), a variety of different collaboration methods (e.g., VOIP, video call, text only, augmented reality, voice only collaboration, or the like), resources to consider, and/or an SME to handle the collaboration. Based on the CONOPS, capabilities, limitations, or other factors, the CEP 212 can select a communication protocol that would, for example, "provide maximum collaboration capability regardless of bandwidth/communications reliability" or "provide most reliable and information assured communications capability regardless of cost or time required".

In one or more embodiments, the CEP 212 can make compliant switching choices so as to provide the highest level of connectivity permitted by the lowest level of constraints from the above limitations and requests. In one or more embodiments, the CEP 212 optionally also subsequently (re)monitors signal strength, bandwidth between primary and remote users, and/or warns a user and/or adjusts the connection pair accordingly, in one or more embodiments, the CEP 212 can switch the users "experience" based on security level, bandwidth, weather, regulations, available equipment, time, cost, priority, urgency (CONOPS), etc. In one or more embodiments, the CEP 212 can include a virtual or physical rotary switch (e.g., combined with health status), which can allow selection of alternative support methods, such as switching into or out of augmented reality on the linkage, etc. In one or more embodiments, the rotary switch can include a corresponding user interface status screen including an indication of a strength of a connection, safety, security, speed, and/or connectivity reliability status. The indication can be in the form of a stop light sort of color indication that indicates whether the status is good (e.g., green), bad (e.g., red), or somewhere in between (e.g., yellow). In one or more embodiments, if the status is not good, the CEP 212 can provide alternative connections for the user if the status is had and/or somewhere in between good and bad.

In one or more embodiments, the system can include a client based sensor switch, a server based switch with client based sensors, or a server based switch that receives client based status and identification data. The CEP 212 can be implements as a dongle, client, or server based software. The dongle can be a USB powered device with an FPGA, memory, sensors, and/or IP interface, such as can meet standards for modems. In one or more embodiments, information obtained by the CEP 212, such as can be provided to the external device, can be gathered over a computer cloud, such as a virtual cloud (e.g., a stream of information in space automatically linked/provided to the consumer from the supplier, such as without ever going hack to an in-country server). In one or more embodiments, the data can be provided in a real time, temporary, transient, virtual floating secure environment.

For the data to be persistent beyond transmission timelines, and to be accessible, the actual bits have to live somewhere. The bits can be distributed across multiple platforms and not externally traceable to each other or attributable to the remote device or the remote location, but there is still a physical manifestation in some locality. Stream processing in some implementations allows data to exist, in essence, only for transmission and processing, with only the processed results available afterwards:

In one or more embodiments, the choices the CEP considers can include multiple CONOPS, such as can include multiple use cases. Each CONOP (e.g., mission scenario) can include a different combination in the database of options, such that respective location and scenario pairs can include a different CEP collaboration pair. The number of combinations and permutations can include a rather high number quickly with just a few variables (e.g., security level, bandwidth available, bandwidth requested, data type, equipment type, or the like), which may be difficult for a person, such as the mechanic in the field to quickly and correctly navigate to effect the best transmission settings, especially given the mechanics primary interest is in fixing the system at hand. So CEP can help facilitate the decision process on how to communicate collaboration information to a remote device, such as by choosing communication protocol, data type, speed of transmission, connecting to VPN/VDI, and/or provide a linkage that matches the requirements for the end user pair.

In one or more embodiments, a drone can provide video, audio, radio frequency (RF) or laser downlinks to a base station. The base station can then remotely send (in an ITAR safe manner) the provided downlink information to another location for post processing. The drone operator need not be concerned with all the legal and IT issues and can simply "initiate" the link and be assured it was working in the most optimal manner for the network, equipment, regulations, and location.

A modem modulates digital information on analogue waves. In the opposite direction, it demodulates analogue data in order to convert them into digital data. Modem is an acronym for "mo(dulate)/dem(odulate)".

Example Including 3D Part Printer

In an alternative embodiment, the resources 218A-C represent detailed component information, such as a 3D CAD drawing. This example uses the system described to provide a physical component (e.g., a bushing, lever, or the like) or system upgrade (e.g., a firmware upgrade to an FPGA) to the equipment 216 with or without also providing information to the remote field device 202 and/or with or without also providing SME advice to a remote user. In example embodiments, the information is used to provide actual just-in-time physical components which are manufactured on-site at or near the equipment 216 location with instructions that are transmitted from resources (e.g., the resources 218A-C) to the device 202 (e.g., a 3D printer or lathe) and subsequently installed at the equipment 216 in the remote location. In alternative example embodiments the information is used to provide a firmware upgrade directly to equipment 216 without reliance on the SME 210 A-B, the remote user 203, and/or the device 202.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 9:
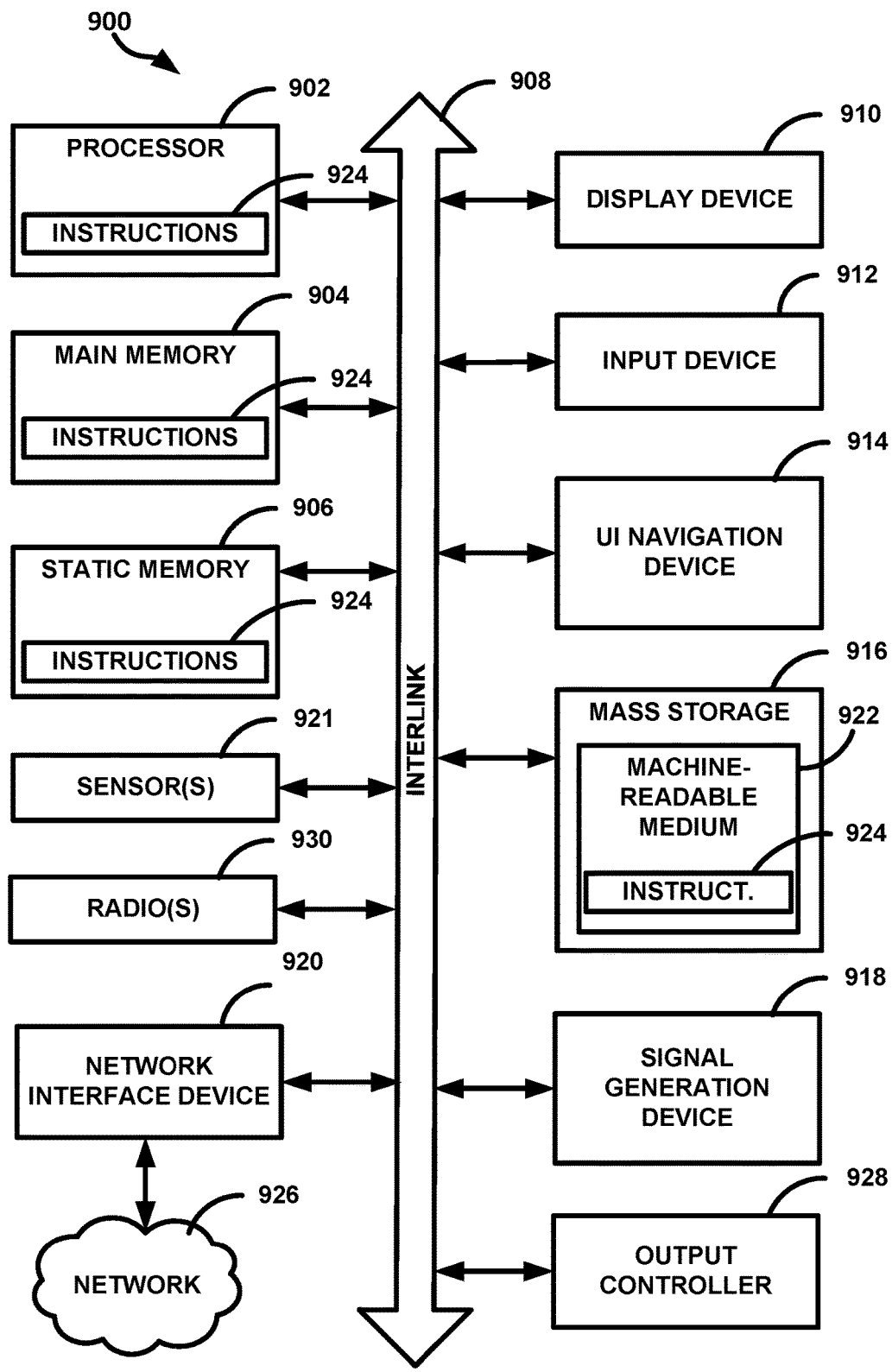
FIG. 9 illustrates, by way of example, a block diagram of an embodiment of a machine in the example form of a computer system within which instructions, for causing the machine to perform any one or more of the methodologies discussed herein, may be executed.

FIG. 9 illustrates, by way of example, a block diagram of an embodiment of a machine in the example form of a computer system 900 within which instructions, for causing the machine to perform any one or more of the methodologies discussed herein, may be executed. In one or more embodiments, the CEP 212, device 202 and/or 210A-B, network 208, equipment 216, VPN 204A-B, gateway 206A-B, or other device discussed herein can include one or more items of the system 900. In one or more embodiments, the CEP 212, device 202 and/or 210A-B, network 208, equipment 216, VPN 204A-B, gateway 206A-B, or other device discussed herein can be implemented using one or inure items of the system 900.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), a network interface device 920, and radios 930 such as Bluetooth, WWAN, WLAN, and NFC, permitting the application of security controls on such protocols.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., hypertext transfer protocol (HTTP), such as HTTP secure (HTTPS)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 can include subject matter (such as a system, apparatus, method, tangible, non-transitory, machine readable medium, etc.) that can include determining a location of a remote communication device by at least one of a global positioning system (GPS), low frequency (LF) atomic time radio, earth magnetic signature, internet protocol (IP) address, and cell phone tower triangulation, determining regulations regarding communication from an internal network to the remote device based on the determined location, and configuring the remote device to transmit and receive communications in a manner compliant with the determined regulations including one of voice over internet protocol (VOIP) communication, hypertext transfer protocol (HTTP) communication, text communication, voice communication, video communication, and augmented reality communication.

In Example 2, Example 1 can further include or use receiving the communications without permanently storing any data on the remote device.

In Example 3, at least one of Examples 1-2 can include or use terminating a connection between the remote device and the internal network, and removing any data received from the internal network in response to the connection being terminated.

In Example 4, at least one of Examples 1-3 can include or use receiving, from the remote device, data indicating at least one of a security level, a cost, bandwidth, priority, power, and speed, and changing the manner in which the remote device transmits and receives communications to one of VOIP communication, HTTP communication, text communication, voice communication, video communication, and augmented reality communication.

In Example 5, at least one of Examples 1-4 can include or use monitoring a bandwidth of the communications between the remote device and the internal network, and in response to determining that the bandwidth is no longer capable of supporting the manner in which communications are transmitted or received, changing the manner in which communications are transmitted or received to a manner that requires less bandwidth.

In Example 6, at least one of Examples 1-5 can include or use monitoring a bandwidth of the communications between the remote device and the internal network, and in response to determining that the bandwidth has increased and is capable of supporting a different manner in which communications are transmitted or received, changing the manner in which communications are transmitted or received to a manner that requires more bandwidth and is allowed by the determined regulations.

In Example 7, at least one of Examples 1-6 can include or use receiving, from the remote device, a request to override the determined regulations, identifying whether the user that requested the override has sufficient permissions to override the determined regulations, and in response to identifying the user has the sufficient permissions, changing the manner in which communications are transmitted or received to the manner that uses the most bandwidth and includes a bandwidth that is less than the bandwidth available at the remote device.

Example 8 can include subject matter (such as a system, apparatus, method, tangible, non-transitory, machine readable medium, etc.) that can include a device (e.g., a dongle) configured to be connected to an input/output port of a remote communication device or internal network, the device including a memory, and processing circuitry coupled to the memory, the processing circuitry configured to execute instructions stored on the memory that, when executed, cause the processing circuitry to perform one or more of Examples 1-7.

In Example 9, Example 8 can further include one or more of a remote device connected to a remote network, a local device connected to a local network, a first virtual private network (VPN) that provides access to resources on the local network to the remote device, a first gateway to provide access control to the local network, wherein the first gateway is communicatively connected between the first VPN and the local network, a second virtual private network (VPN) that provides access to resources on the local network to the local device, a second gateway to provide access control to the local network, wherein the second gateway is communicatively connected between the second VPN and the local network, and resources accessible over the local network (e.g., through the first and/or second VPN and/or the first and/or second gateway).

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for providing information for a collaboration between a remote communication device and a device connected to an internal network, the method comprising:
    determining a location of the remote communication device by at least one of a global positioning system (GPS), low frequency (LF) atomic time radio, earth magnetic signature, internet protocol (IP) address, and cell phone tower triangulation;
    identifying regulations regarding communication from the internal network to the remote device based on the determined location and a location of the internal network;
    identifying a bandwidth of a remote network, different from the internal network, to which the remote communication device is connected, the remote network communicatively accessible by the internal network;
    estimating a battery life of the remote device and an amount of time the remote device can communicate with the device of the internal network using each of voice over internet protocol (VOIP) communication, hypertext transfer protocol (HTTP) communication, text communication, voice communication, video communication, and augmented reality communication;
    selecting, based on the estimated battery life and the amount of time the remote device can communicate, a communication protocol including one of VOIP communication, HTTP communication, text communication, voice communication, video communication, and augmented reality communication;
    configuring the remote device to transmit and receive communications in a manner compliant with the identified regulations and the selected communication protocol; and
    transmitting VOIP communications, HTTP communications, text communications, voice communications, video communications, or augmented reality communications to the remote device based on the selected communication protocol, the estimated battery life and the identified bandwidth.

2. The method of claim 1, wherein the method further comprises receiving the communications without permanently storing any data on the remote device.

3. The method of claim 2, wherein the method further includes:
    terminating a connection between the remote device and the internal network; and
    removing any data on the remote device received from the internal network in response to the connection being terminated.

4. The method of claim 3, further comprising:
    receiving, from the remote device, data indicating at least one of a security level, a cost, priority, power, and speed of the remote network; and
    changing the manner in which the remote device transmits and receives communications to one of VOIP communication, HTTP communication, text communication, voice communication, video communication, and augmented reality communication based on the received data.

5. The method of claim 4, further comprising:
    monitoring a bandwidth of the communications between the remote device and the internal network; and
    in response to determining that the bandwidth is no longer capable of supporting the manner in which communications are transmitted or received, changing the manner in which communications are transmitted or received to a manner that requires less bandwidth.

6. The method of claim 4, further comprising:
    monitoring a bandwidth of the communications between the remote device and the internal network; and
    in response to determining that the bandwidth has increased and is capable of supporting a different manner in which communications are transmitted or received, changing the manner in which communications are transmitted or received to a manner that requires more bandwidth and is allowed by the identified regulations.

7. The method of claim 6, further comprising:
    receiving, from the remote device, a request to override the determined regulations; and
    identifying whether a user of the remote device that requested the override has sufficient permissions to override the determined regulations; and
    in response to identifying the user has the sufficient permissions, changing the manner in which communications are transmitted or received to the manner that uses the most bandwidth and includes a bandwidth that is less than the bandwidth available at the remote device.

8. The method of claim 1, wherein determining the location of the remote communication device includes determining the remote device is in one of (1) a different country than the internal network and (2) a same country as the internal network.

9. A non transitory machine-readable storage device including instructions stored thereon that, when executed by the machine, configure the machine to perform operations for remote collaboration between a user of remote communication device and a user of a device of an internal network, the operations comprising:
    determining a location of the remote communication device by at least one of a global positioning system (GPS), low frequency (LF) atomic time radio, earth magnetic signature, internet protocol (IP) address, and cell phone tower triangulation;
    identifying regulations regarding communication from the internal network to the remote device based on the determined location and a location of the internal network;
    identifying a bandwidth of a remote network, different from the internal network, to which the remote communication device is connected, the remote network communicatively accessible by the internal network;
    estimating a battery life of the remote device and an amount of time the remote device can communicate with the device of the internal network using each of voice over internet protocol (VOIP) communication, hypertext transfer protocol (HTTP) communication, text communication, voice communication, video communication, and augmented reality communication;
    selecting, based on the estimated battery life and the amount of time the remote device can communicate, a communication protocol including one of VOIP communication, HTTP communication, text communication, voice communication, video communication, and augmented reality communication;

configuring the remote device to transmit and receive communications in a manner compliant with the identified regulations and the selected communication protocol; and transmitting VOIP communications, HTTP communications, text communications, voice communications, video communications, or augmented reality communications to the remote device based on the selected communication protocol, the estimated battery life and the identified bandwidth.

10. The storage device of claim 9, further including instructions that, when executed by the machine, configure the machine to perform further operations comprising:

receiving the communications at the remote device without permanently storing any data on the remote device.

11. The storage device of claim 10, further including instructions that, when executed by the machine, configure the machine to perform further operations comprising:

terminating a connection between the remote device and the internal network; and removing any data received at the remote device and from the internal network in response to the connection being terminated.

12. The storage device of claim 11, further including instructions that, when executed by the machine, configure the machine to perform further operations comprising:

receiving, from the remote device, data indicating at least one of a security level, a cost, power, and speed; and changing the manner in which the remote device transmits and receives communications to one of VOIP communication, HTTP communication, text communication, voice communication, video communication, and augmented reality communication based on the received data.

13. The storage device of claim 12, further including instructions that, when executed by the machine, configure the machine to perform further operations comprising:

monitoring a bandwidth of the communications between the remote device and the internal network; and in response to determining that the bandwidth is no longer capable of supporting the manner in which communications are transmitted or received, changing the manner in which communications are transmitted or received to a manner that requires less bandwidth.

14. The storage device of claim 12, further including instructions that, when executed by the machine, configure the machine to perform further operations comprising:

monitoring a bandwidth of the communications between the remote device and the internal network; and in response to determining that the bandwidth has increased and is capable of supporting a different manner in which communications are transmitted or received, changing the manner in which communications are transmitted or received to a manner that requires more bandwidth and is allowed by the identified regulations.

15. The storage device of claim 14, further including instructions that, when executed by the machine, configure the machine to perform further operations comprising:

receiving, from the remote device, a request to override the determined regulations;

identifying whether the user of the remote device that requested the override has sufficient permissions to override the identified regulations; and in response to identifying the user has the sufficient permissions, changing the manner in which communications are transmitted or received to the manner that uses the most bandwidth and includes a bandwidth that is less than the bandwidth available at the remote device.

16. The storage device of claim 9, wherein determining the location of the remote communication device includes determining that the remote communication device is in one of (1) a different country than the internal network and (2) a same country as the internal network.

17. A dongle configured to be connected to an input/output port of a remote communication device or internal network, the dongle including:

a memory;

processing circuitry coupled to the memory, the processing circuitry:

determines a location of the remote communication device by at least one of a global positioning system (GPS), low frequency (LF) atomic time radio, earth magnetic signature, internet protocol (IP) address, and cell phone tower triangulation;

identifying regulations regarding communication from the internal network to the remote device based on the determined location and a location of the internal network;

identifies a bandwidth of a remote network, different from the internal network, to which the remote communication device is connected, the remote network communicatively accessible by the internal network;

estimates a battery life of the remote device and an amount of time the remote device can communicate with the device of the internal network using each of voice over internet protocol (VOIP) communication, hypertext transfer protocol (HTTP) communication, text communication, voice communication, video communication, and augmented reality communication;

selects, based on the estimated battery life and the amount of time the remote device can communicate, a communication protocol including one of VOIP communication, HTTP communication, text communication, voice communication, video communication, and augmented reality communication;

configures the remote device to transmit and receive communications in a manner compliant with the identified regulations and the selected communication protocol; and provides VOIP communications, HTTP communications, text communications, voice communications, video communications, or augmented reality communications to the remote device based on the selected communication protocol, estimated battery life and the identified bandwidth.

18. The dongle of claim 17, wherein the processing circuitry receives the communications without permanently storing any data on the memory.

19. The dongle of claim 18, wherein the processing circuitry:

terminates a connection between the remote device and the internal network; and removes any data at the remote device and received from the internal network in response to the connection being terminated.

20. The dongle of claim 18, wherein the processing circuitry:

receives, from the remote device, data indicating at least one of a security level, a cost, and speed; and changes the manner in which the remote device transmits and receives communications to one of VOIP communication, HTTP communication, text communication, voice communication, video communication, and augmented reality communication based on the received data.

21. The dongle of claim 20, wherein the processing circuitry:
monitors a bandwidth of the communications between the remote device and the internal network; and
in response to a determination that the bandwidth is no longer capable of supporting the manner in which communications are transmitted or received, changes the manner in which communications are transmitted or received to a manner that requires less bandwidth.

22. The dongle of claim 20, wherein the processing circuitry:
monitors a bandwidth of the communications between the remote device and the internal network; and
in response to a determination that the bandwidth has increased and is capable of supporting a different manner in which communications are transmitted or received, changes the manner in which communications are transmitted or received to a manner that requires more bandwidth and is allowed by identified regulations.

23. The dongle of claim 17, wherein the remote device is in one of (1) a different country than the internal network and (2) a same country as the internal network.

* * * * *

UNITED STATES PATENT AND TRADEMARK OFFICE
CERTIFICATE OF CORRECTION

Page 1 of 2

PATENT NO. : 10,142,410 B2
APPLICATION NO. : 15/178494
DATED : November 27, 2018
INVENTOR(S) : Giffin et al.

It is certified that error appears in the above-identified patent and that said Letters Patent is hereby corrected as shown below:

On the Title Page

On page 2, in Column 2, item (56), under "Other Publications", Line 1, delete "PCTIUS2017/029340," and insert --PCT/US2017/029340,-- therefor In the Specification In Column 4, Line 10, delete "Internet," and insert --internet,-- therefor In Column 4, Line 28, delete "210 A-B." and insert --210A-B.-- therefor In Column 5, Line 3, delete "dangle," and insert --dongle,-- therefor In Column 5, Line 63, delete "218B," and insert --218B),-- therefor In Column 6, Line 1, delete "2181-C" and insert --218A-C-- therefor In Column 6, Line 19, delete "210 A-B," and insert --210A-B,-- therefor In Column 8, Line 9, delete "LIAR" and insert --ITAR-- therefor In Column 8, Line 19, delete "dangle" and insert --dongle-- therefor In Column 8, Line 23, after "capabilities", insert --.--

In Column 9, Line 30, after "for", delete "if"

In Column 9, Line 32, delete "sick" and insert --side-- therefor

Signed and Sealed this
Twenty-eighth Day of April, 2020

Andrei Iancu
*Director of the United States Patent and Trademark Office*

CERTIFICATE OF CORRECTION (continued)
U.S. Pat. No. 10,142,410 B2

In Column 11, Line 16, delete "VIM" and insert --VDI-- therefor

In Column 11, Line 52, after "etc.)", insert --)--

In Column 11, Line 53, delete "(FIR)" and insert --(HR)-- therefor

In Column 11, Line 65, delete "Internet" and insert --internet-- therefor

In Column 12, Line 36, delete "accordingly, in" and insert --accordingly. In-- therefor In Column 12, Line 53, delete "had" and insert --bad-- therefor In Column 12, Line 67, delete "hack" and insert --back-- therefor In Column 13, Line 12, delete "afterwards:" and insert --afterwards.-- therefor In Column 13, Line 62, delete "210 A-B," and insert --210A-B,-- therefor In Column 15, Line 32, delete "(APIs).)" and insert --(APIs)).-- therefor In Column 16, Line 23, delete "inure" and insert --more-- therefor In the Claims In Column 23, Line 25, in Claim 22, after "by", insert --the--